(12) United States Patent
Naeyaert

(10) Patent No.: US 12,325,099 B2
(45) Date of Patent: Jun. 10, 2025

(54) METHOD FOR MANUFACTURING PANELS

(71) Applicant: FLOORING INDUSTRIES LIMITED, SARL, Bertrange (LU)

(72) Inventor: Christophe Naeyaert, Jabbeke (BE)

(73) Assignee: UNILIN BV, Wielsbeke (BE)

( * ) Notice: Subject to any disclaimer, the term of this patent is extended or adjusted under 35 U.S.C. 154(b) by 279 days.

(21) Appl. No.: 17/757,538

(22) PCT Filed: Dec. 9, 2020

(86) PCT No.: PCT/IB2020/061701
§ 371 (c)(1),
(2) Date: Jun. 16, 2022

(87) PCT Pub. No.: WO2021/124025
PCT Pub. Date: Jun. 24, 2021

(65) Prior Publication Data
US 2022/0331925 A1    Oct. 20, 2022

(30) Foreign Application Priority Data

Dec. 18, 2019    (BE) ................................ 2019/5940

(51) Int. Cl.
*B23Q 17/22* (2006.01)
*B23Q 17/24* (2006.01)
(Continued)

(52) U.S. Cl.
CPC ....... *B23Q 17/2233* (2013.01); *B23Q 17/249* (2013.01); *B26D 3/065* (2013.01);
(Continued)

(58) Field of Classification Search
CPC .... B23Q 17/2233; B23Q 17/249; B27M 1/08; B27M 3/04; B27F 1/06; B27F 1/02; B26D 3/065
(Continued)

(56) References Cited

U.S. PATENT DOCUMENTS 9,290,951 B2    3/2016    Moriau et al.
9,314,888 B2    4/2016    Pervan et al.
(Continued)

FOREIGN PATENT DOCUMENTS

CN    101158226 A    4/2008
CN    101489744 A    7/2009
(Continued)

OTHER PUBLICATIONS

Search Report from corresponding Belgian Application No. 201905940, Sep. 10, 2020.
(Continued)

*Primary Examiner* — Nhat Chieu Q Do
(74) *Attorney, Agent, or Firm* — Workman Nydegger

(57) ABSTRACT

A method for manufacturing panels such that the panels are subjected on at least one side to an operation with cutting tools. The position and/or orientation of each panel is determined prior to the operation, and the position and/or orientation of each panel is adjusted prior to the operation and/or the position of the tools is potentially adjusted, such that at least one part of each panel concerned takes a fixed orientation and position in relation to the tools.

10 Claims, 4 Drawing Sheets

(51) Int. Cl.
    *B26D 3/06*     (2006.01)
    *B27F 1/06*     (2006.01)
    *B27M 1/08*     (2006.01)
    *B27M 3/04*     (2006.01)

(52) U.S. Cl.
    CPC ................ *B27F 1/06* (2013.01); *B27M 1/08* (2013.01); *B27M 3/04* (2013.01)

(58) Field of Classification Search
    USPC .......................................................... 83/875
    See application file for complete search history.

(56) References Cited

U.S. PATENT DOCUMENTS

| | | |
|---|---|---|
| 10,493,653 B2 | 12/2019 | Hermann et al. |
| 2007/0209736 A1 | 9/2007 | Deringor et al. |
| 2009/0049792 A1 | 2/2009 | Cappelle et al. |
| 2009/0223600 A1* | 9/2009 | Tappan ................. B44B 5/0057 |
| | | 144/144.1 |
| 2009/0249731 A1 | 10/2009 | Cappelle |
| 2018/0133922 A1* | 5/2018 | Herrmann ......... E04F 15/02033 |

FOREIGN PATENT DOCUMENTS

| | | | |
|---|---|---|---|
| CN | 102470543 A | 5/2012 | |
| JP | H11510869 A | 9/1999 | |
| WO | 9747834 A1 | 12/1997 | |
| WO | 2006066776 A2 | 6/2006 | |
| WO | 2006103565 A2 | 10/2006 | |
| WO | WO-2010085886 A1 * | 8/2010 | ............... B27F 1/06 |
| WO | 2011077311 A2 | 6/2011 | |
| WO | 2016180643 A1 | 11/2016 | |

OTHER PUBLICATIONS

International Search Report from PCT Application No. PCT/B2020/061701, Feb. 25, 2021.

* cited by examiner

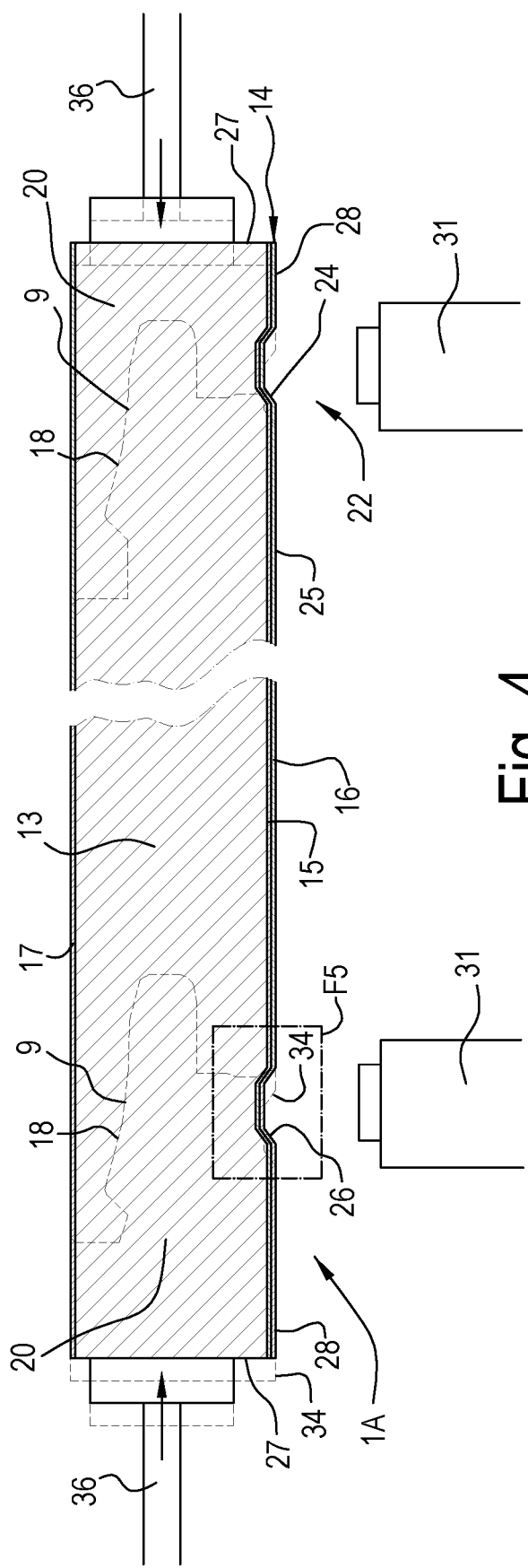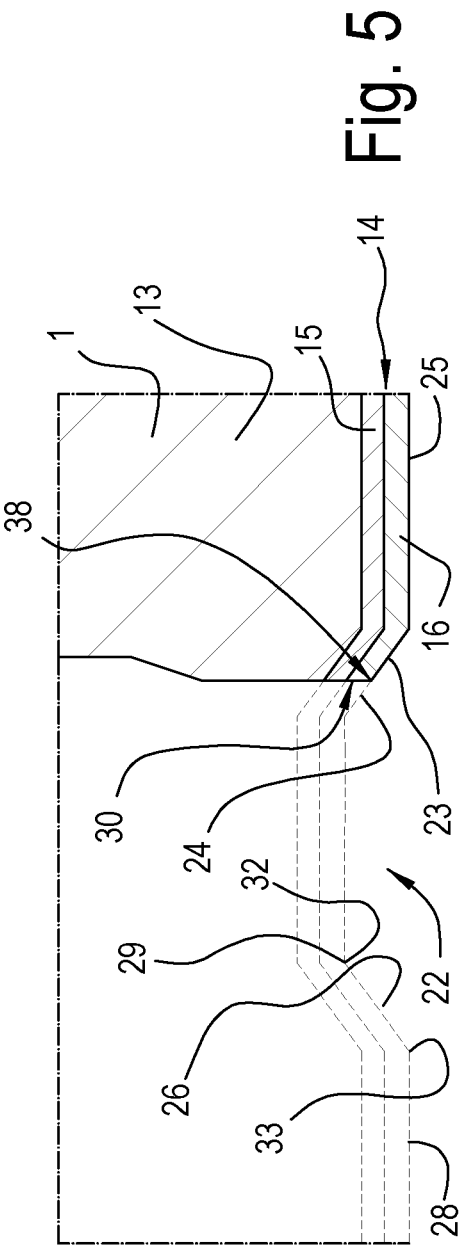

METHOD FOR MANUFACTURING PANELS

CROSS-REFERENCE TO RELATED APPLICATIONS

The application is a U.S. national phase application of PCT/IB2020/061701, filed on Dec. 19, 2020, and claims the foreign priority of BE 2019/5940, filed on Dec. 18, 2019.

BACKGROUND

This invention relates to a method for manufacturing panels.

More specifically, the invention relates to a method for manufacturing panels, wherein the panels concerned are subjected to an operation using cutting tools on at least one side.

It is known, for example from WO 97/47834, WO 2006/103565 and WO 2011/077311 that panels such as floor panels can be fitted with profiled edge areas by milling. For example, in the case of floor panels, profiles can be formed which include mechanical coupling means. The milling operation is carried out by means of one or more rotary milling tools in a continuous milling machine. WO 2006/103565 revealed that for this purpose the panels can be oriented with their decorative surface facing down and transported through the continuous milling machine by means of a chain, with cams, while, for example, they are profiled on one or both long edges using the above milling tools. According to WO 565, a guide groove can be provided in the panels, while this guide groove in the continuous milling machine works together with a guide knife to maintain accuracy, even at high throughput speeds. The accuracy obtained here mainly concerns the straightness and squareness of the panels.

It is known from WO 2006/066776 to provide lower edge areas at the edges of floor panels by means of a pressing operation. WO 776 recognizes the risk that such edge areas may be removed when performing a milling operation and suggests to modify the geometry of the lower edge area to minimize the risk of complete removal or poor panel connection. Such a measure seems appropriate even when a guide groove as revealed in WO 565 should be applied, but it somewhat limits the design freedom and the attainable imitation of, for instance, a real wooden floor panel.

SUMMARY

The present invention is primarily intended to provide an alternative method for manufacturing panels, in which, according to various preferred embodiments, a solution is offered to the problems using state-of-the-art technology.

To this end, the invention concerns a method for manufacturing panels, wherein the panels concerned are subjected on least one side to an operation with cutting tools, characterized in that the position and/or orientation of each panel is determined prior to the operation, and that the position and/or orientation of each panel prior to the operation, and/or position of the tools, is potentially adjusted such that at least one part of each panel concerned is in a fixed orientation and position relative to said tools. Because that particular part, for instance a lower edge area, takes a predetermined, fixed, orientation and position relative to the tools, the operation can be performed at an accurate distance from this part.

Preferably, the panels concerned are subjected to an operation with cutting tools on at least two opposite sides.

Preferably, said operation with cutting tools provides the relevant sides with profiled edge areas, which preferably include mechanical coupling means allowing two such panels to be coupled, for instance to be locked together in both the horizontal and vertical directions. Preferably, this involves coupling means of the type basically known in the WO 97/47834. Preferably, said coupling means are mainly designed as a tongue and groove coupling equipped with locking means or locking parts, wherein said tongue and groove coupling achieves said vertical lock, while said locking means or parts are provided for realizing said lock in the horizontal direction. Preferably, the aforementioned coupling means are realized in one piece in the material of the panel concerned. Preferably, said coupling means are provided on the basis of a milling operation with rotary milling tools. Preferably, the panel of the invention is a rectangular, either elongated or square, floor panel provided with mechanical coupling means on both pairs of opposite edges. The mechanical coupling means may allow a coupling on the basis of a tilting movement along the respective edges and/or a horizontal sliding movement of the edges toward each other and/or a downward movement of a male coupling part, for instance with a tongue, into a female coupling part, for example with a groove.

Preferably, the aforementioned operation with cutting tools takes place in a continuous milling machine, wherein the panel is fed through the continuous milling machine in a fixed cross position and orientation relative to the tools, for instance using a feed-through or transport device wherein the panel is clamped between a conveyor chain and pressure belts. "Cross position" refers to the position at right angles to the feed direction of the continuous milling machine. Preferably, the position and/or orientation of the panel to be milled is determined and adjusted before this panel is fixed in the desired position and orientation by the conveyor device of the continuous milling machine.

According to the most preferred embodiment, the potential adjustment of the orientation and/or position of a panel concerned is carried out independently of the machining operation, and preferably, the panel is fed into the operation in the adjusted position and/or orientation. The determination and potential adjustment of the position and/or orientation of the panel thus takes place independent of the feed-through device of the continuous milling machine. This means that this occurs while the panel is not yet in contact with the components of the feed-through device of the continuous milling machine, or at least it has not yet been clamped in this feed-through device.

Preferably, the position and/or orientation of the panels is determined on the basis of optical techniques. For instance, one or more cameras or scanners may be applied.

Preferably, said part is a lower area in the surface provided on the relevant side of the panel to be milled and, preferably, is provided to form a lower edge area of the eventually obtained panel. Preferably, said lower area has a first ascending transition zone to the actual top surface of the panel. In such a case, said operation preferably provides for realizing the final edge of the panel, with this edge being situated in said first ascending transition zone. According to the current embodiment, measures such as those proposed in WO 776 are superfluous, and imitation of, for instance, a beveled edge or other chamfer on a wooden floor panel may be realized in a more convincing way.

Preferably, said lower area has a second ascending transition zone towards the actual edge of the panel to be machined, wherein said operation would preferably provide at least for the removal of the corresponding ascending transition zone. Preferably, the second ascending transition zone is used to determine the position and/or orientation of the panel. Preferably, this second transition zone is globally provided in parallel to said first transition zone. However, the first transition zone may be provided locally with structural characteristics which deviate from the parallel, such as recesses imitating splinters or other imperfections, or be realized with varying directions, but, overall, remain parallel to the second transition zone. These possibilities ensure that the potential artificial appearance is minimized.

Preferably, said panel has a substrate with a decorative top layer attached to it.

Preferably, the substrate consists mainly of an MDF or HDF board (medium or high density fiberboard), preferably with an average density of more than 800 kilograms per cubic meter. Preferably it involves an HDF board of the type which shows a locally higher density at both surfaces, so-called peak density, which amounts to at least 110% of the average density. It is clear that in such a case, the more centrally located HDF material has a density that is lower than the average density and, for instance, has a density lower than 90% of this average density. Preferably, said substrate has a density higher than 900 kilograms per cubic meter at the actual substrate surface. In the case of an HDF board with a peak density of at least 110% of the average density, said lower edge area extends preferably deeper than the zone with said peak density, that is preferably into a zone with a density corresponding to the average density of the board concerned or less.

Preferably, the decorative top layer is a laminate formed on the basis of melamine resin or other thermosetting resin, and possibly one or more paper sheets. The laminate preferably includes at least one printed and resin-provided paper sheet, and preferably a resin-provided transparent or translucent paper sheet applied on top thereof. The laminate may further include wear-resistant particles located above the print. Preferably, the laminate is bonded to the substrate material without additional intermediate glue or resin layers, namely both on the actual top surface and on the lower edge area. The laminate is preferably of the type DPL ("Direct Pressure Laminate"). A special feature of a DPL technique is that the laminate layer is formed by consolidating at least one decorative paper and one or more layers of synthetic material, whether or not provided on the decorative paper, for example by means of an impregnation technique. The synthetic material is a thermally setting material, such as melamine resin. The consolidation involves at least a setting or crosslinking of the thermally setting synthetic material. At the same time, i.e. using one and the same pressing operation, this laminate layer is attached to the substrate. For the most common DPL panels, the laminate layer is composed of a thermosetting resin-provided decorative paper with a transparent layer applied on top that contains thermosetting resin, also called overlay. At the bottom of the substrate material, preferably, a resin layer, for instance at least one resin-soaked paper sheet, is provided during the same pressing operation. This serves as a balancing layer for any tensile stresses in the laminate layer on the top surface, to ensure that a stable, pressed whole can be created.

Other possibilities for the substrate include a thermoplastic substrate, for instance based on PVC and fillers, or a mineral-based substrate, for instance based on cement such as Portland cement or magnesium oxide, which may also include fillers.

Other possibilities for the decorative top layer include decorative top layers which comprise a printed plastic film, or which include a print directly formed on the substrate, or which include a natural material, such as a wood veneer.

Preferably, the aforementioned panel is a floor panel, preferably of the type that can be used to create a floating flooring system. According to the most preferred embodiment, the floor panel is a laminate floor panel with a substrate made of MDF or HDF and a decorative laminate top layer as described above. According to variants, the floor panel is an LVT, SPC or WPC floor panel, namely a floor panel with a thermoplastic substrate and a decorative top layer with a printed plastic film or a print directly on the substrate.

Preferably, the panels concerned are subjected to successive operations with cutting tools on at least two sides that extend transversely to each other, wherein the position and/or orientation of each panel is determined prior to each operation, and the orientation and/or position of the panel prior to the first operation is potentially adjusted without adjusting the position of the tools of the first operation, while the position of the tools in the second operation is potentially adjusted, without adjusting the orientation and position of the panel.

According to the most preferred embodiment, said panel is rectangular and oblong and the first operation is performed on at least one side of the long pair of sides, and the second operation is performed on at least one side of the short pair of sides. Preferably, in the first operation, both sides of the long pair are processed, for instance at least for the provision of profiled edge areas that include coupling means, and in the second operation both sides of the short pair are processed, for instance at least for the provision of profiled edge areas that include coupling means.

Preferably, the method of the invention is used for manufacturing panels, more specifically floor panels, with an MDF or HDF substrate and a decorative top layer of laminate applied to it, wherein the panel is at least two opposite panel edges is provided with a lower edge area in the upper surface, wherein said top layer extends uninterruptedly from the actual top surface, over the surface of the lower edge area, to the edge of the top surface. Preferably, a panel obtained by the method of the present invention at least has a lower edge area in the upper surface at a pair of long edges, preferably in the form of a straight or curved chamfer. Preferably, this involves a so-called pressed-in chamfer, that is a chamfer obtained during the same pressing operation applied to realize the DPL laminate layer on the surface of the substrate. Clearly, the lower edge area, mentioned in the current preferred embodiment, is preferably formed from a lower area of a panel to be milled as mentioned above.

BRIEF DESCRIPTION OF THE DRAWINGS

With a view to better demonstrating the characteristics of the invention, the following, as an example without any restrictive character, describes some preferred embodiments, with reference to the accompanying drawings, wherein:

FIG. 4 shows a cross-section on a larger scale along the IV-IV line shown in FIG. 1;

FIG. 5 represents on a larger-scale the area identified by F5 in FIG. 4;

DETAILED DESCRIPTION OF VARIOUS EMBODIMENTS

Figure 1:
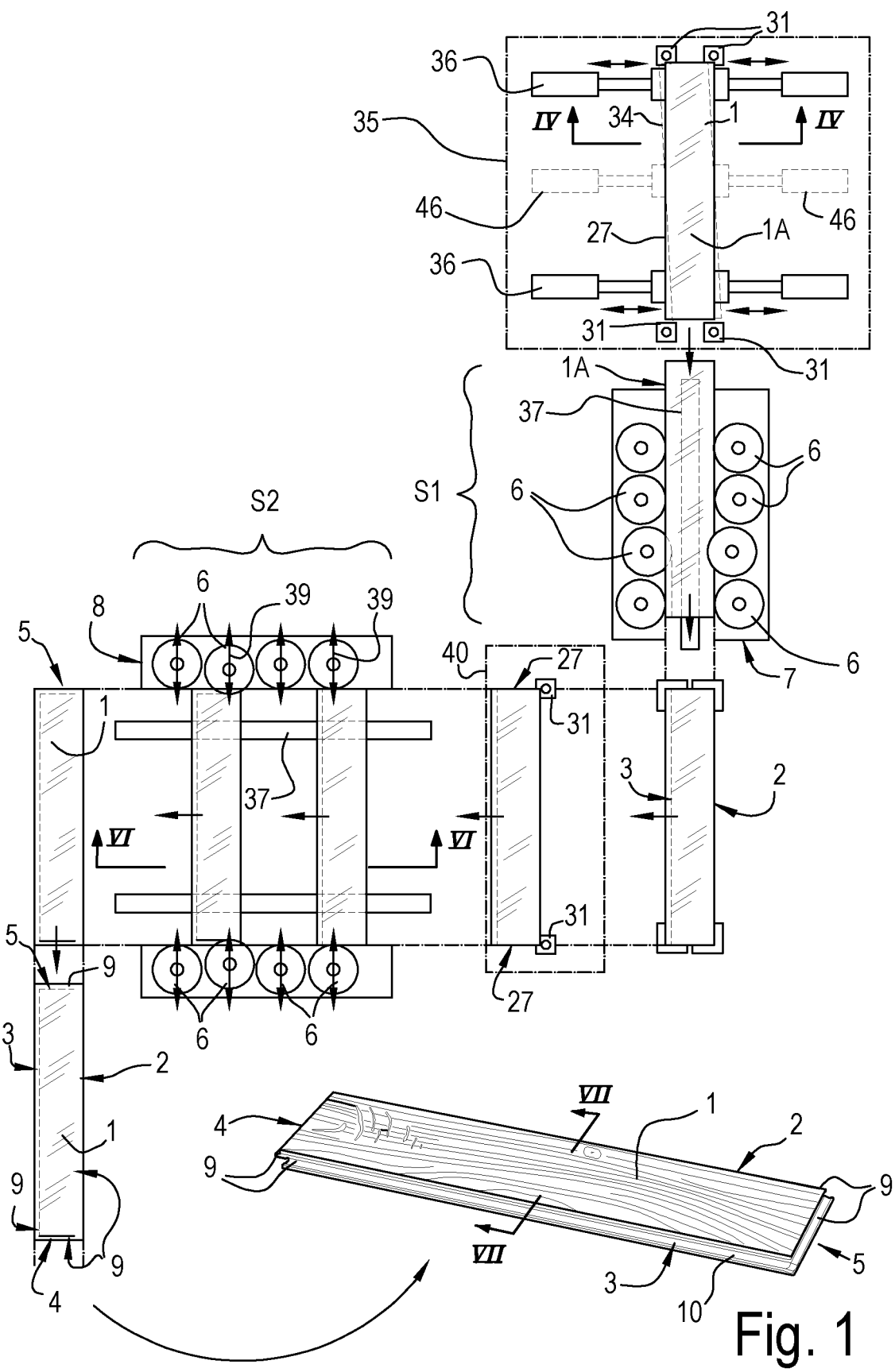
FIG. 1 shows a few steps in a method with the characteristics of the present invention.

FIG. 1 shows a method for manufacturing panels, in this case floor panels 1. The corresponding floor panels 1 are rectangular and oblong and they are subjected on both the long pair of opposite edges 2-3 and the short pair of opposite edges 4-5, to an operation S1-S2 by means of cutting tools 6. As shown, for this purpose two continuous milling machines 7-8 are used, wherein in a first continuous milling machine 7 the two opposite long sides 2-3 are milled, and in a second continuous milling machine 8 the two opposite short sides 4-5 are milled. The relevant operations S1-S2 provide the relevant sides 2-3; 4-5 with profiled edge areas 9 which include mechanical coupling means 10, which allow two of these floor panels 1 to be coupled together.

Figure 2:
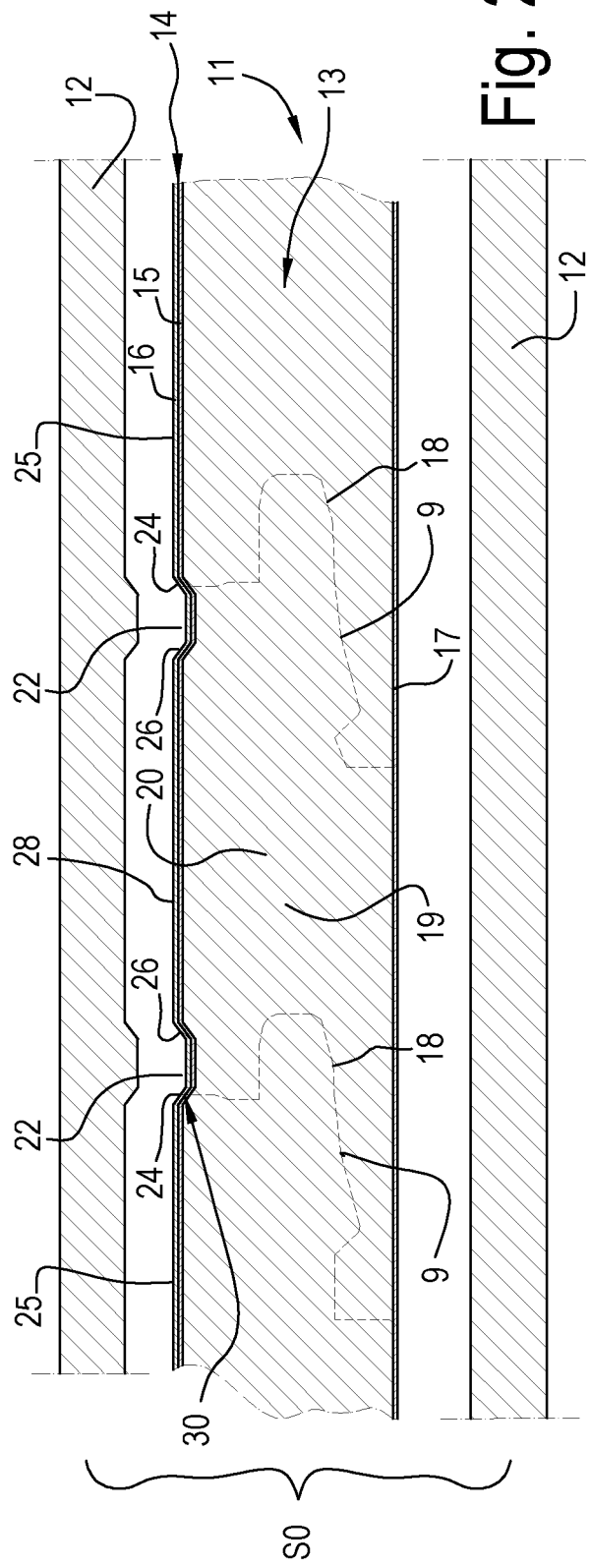
FIGS. 2 and 3 show some preliminary steps to the steps in FIG. 1.
Figure 3:
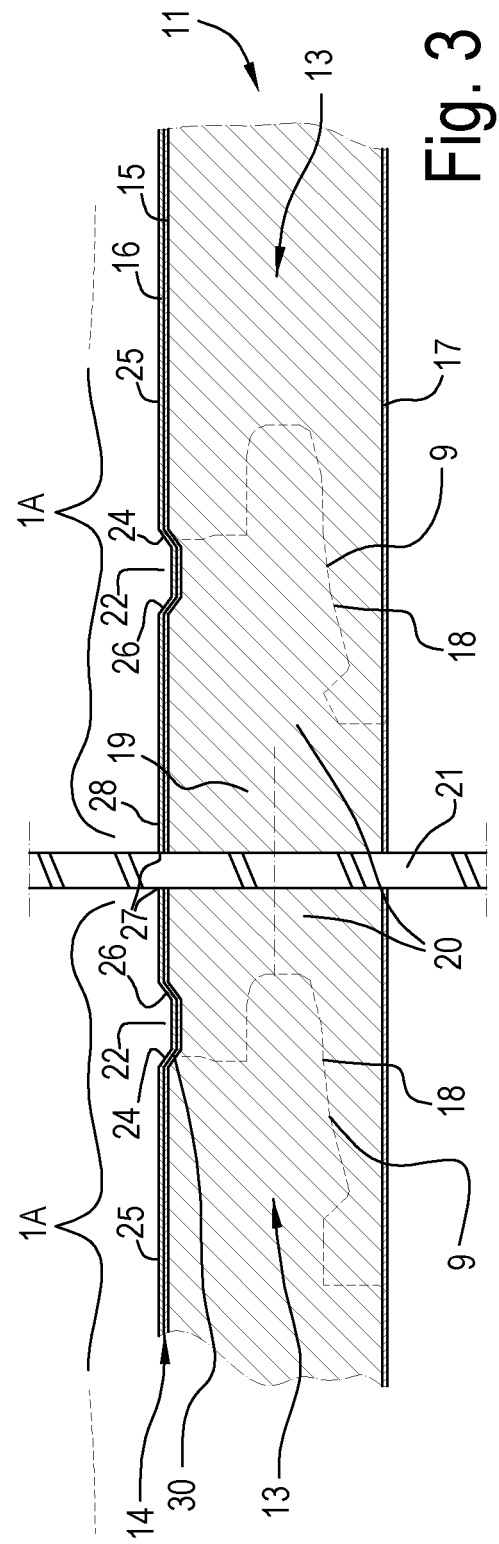

FIGS. 2 and 3 respectively show that for the manufacturing of the floor panels 1 in FIG. 1, prior to the milling operations S1-S2 larger sheets 11 are pressed by means of a DPL pressing operation S0, and are subdivided into panels 1A to be processed further. The pressing operation S0 takes place between two heated press elements 12 of a so-called short-stroke press or single daylight press. This is a discontinuous heated pressing operation with an opening and closing press. The laminate sheet 11 comprises a substrate 13, preferably MDF or HDF, and an applied decorative top layer 14 made of laminate. The laminate is formed on the basis of melamine resin and, in this case, two sheets of paper 15-16, on the one hand a printed paper sheet 15 and, on the other hand, on top of the printed paper sheet 15 a transparent or translucent sheet of paper 16. The top layer 14 of laminate is obtained on the basis of the pressing operation S0 shown in FIG. 2. Here the paper sheets 15-16 are consolidated together and the existing melamine resin is set. In the same pressing operation S0, the attachment of the top layer 14 to the substrate 13 is obtained. At the bottom of substrate 13, a paper sheet 17, soaked in resin, is attached during the same pressing operation S0 as a balancing layer.

Obviously, preferably from one single pressed sheet 11, several floor panels 1 or panels 1A to be machined further are formed during a dividing operation as the one shown in FIG. 3.

The contours of the profiled edge areas 9 of two finished floor panels 1 which are adjacent in the laminate sheet 11 are shown in dashed line 18. Between these contours lies the so-called technical zone 19, which is a material part 20 of the laminate sheet 11 intended to be removed to obtain the final floor panels 1. The removal of this material part 20 is done in the example by means of the dividing operation, more specifically sawing operation 21, of FIG. 3, and the milling operation S1, in FIG. 1.

FIGS. 2 and 3 also show that, preferably by means of the same pressing operation S0, the pressed sheet 11 has lower areas 22, which in the final floor panels 1 form the lower edge areas 23. Those lower areas 22 have a first ascending transition zone 24 to the actual upper surface 25 of the panels 1A or floor panels 1. In the example, the lower area 22 shows a second ascending transition zone 26 to the actual edge 27 of the panel 1A to be milled. The second ascending transition zone 26 extends globally parallel to the first ascending transition zone 24. The upper surface area 28 of said technical area 19 is preferably situated for most of it at a level further from the center of the panel 1A than the lowest point 29 of the lower area 22, for instance, at a level that coincides or almost coincides, for instance with a height difference of 0.2 millimeters or less, with the level of the actual top surface 25 of the panel 1A to be machined. That way, a low pressure zone is obtained in the technical zone 19 during the pressing operation S0, and any pressing defects may accumulate there, as further revealed in WO 776 as mentioned in the introduction.

In the example, the top layer 14 extends uninterruptedly from the actual top surface 25 of the panels 1A or floor panels 1, over the surface of the lower edge area 23, more specifically at least over the surface of the first ascending transition zone 24, to the edge 30 of the top surface 25 of the final floor panel 1. In this case, the top layer 14 is uninterrupted at least as far as the second transition zone 26, at least as far as the part of the technical zone 19, between two adjacent second transition zones 26 or even, as shown here, uninterrupted over at least two to be machined panels 1A adjacent to each other in the laminate plate 11.

FIG. 1 shows that, both prior to the operation S1 on the long opposite sides 2-3, and prior to operation S2 on the short opposite sides 4-5, the position and orientation of each panel 1A to be milled is determined, by optical techniques, for example, using cameras 31. Preferably, as shown in FIG. 4, the position of the said second transitional zone 26, more specifically starting point 32 or its end point 33, is determined for this purpose.

Potentially, the position and orientation of the panel 1A to be machined is adjusted prior to the processing operation S1 on the long opposite sides 2-3, as shown in dashed line 34 in FIGS. 1 and 4, in a station 35. This can be done by means of actuators 36 such as servo motors and/or hydraulic and/or pneumatic cylinders. In this case, the adjustment of the position and/or orientation is independent of the cutting operation S1, that is while the panel 1A to be machined does not yet contact the components of the feed-through device 37 of the continuous milling machine 7. After the potential adjustment of the position and/or orientation, the panel 1A to be machined is transferred in the desired position and orientation to the feed-through or transport device 37 of the continuous milling machine 7, wherein the panel 1A is fed through the continuous milling machine 7 in this fixed transverse position in relation to the tools 6 to process the long opposite sides 2-3. Preferably, the positioning and orientation of the panel 1A to be machined is such that said first ascending transition zone 24 takes a fixed orientation and position relative to the said tools 6. The position of the tools 6 in the first continuous milling machine 7 is not adjusted here. Preferably, a profiled edge area 9 is reached as shown in FIG. 5, with a top edge 38 situated in the first ascending transition zone 24.

Potentially, the position of the milling tools 6 in the continuous milling machine 8 for shaping the profiled edge areas 9 on the short opposite sides 4-5 is adjusted, as shown by the arrows 39, based on the determination of the position and/or orientation of the panel 1A to be machined in the station 40. Preferably, the positioning of the milling tools 6 is such that said first ascending transition zone 24 takes a fixed orientation and position in relation to said tools 6. The position of the panel 1A to be milled is not adjusted here. Preferably, also on the short opposite sides 4-5 a profiled edge area 9 is achieved as shown in FIG. 5, that is with a top edge 38 situated in the first ascending transition zone 24.

Obviously, the method of the present invention, in the example of the figures, is used to manufacture floor panels 1 which have a lower edge area 23 on both the short opposite sides 4-5 and on the long opposite sides 2-3, and the potential adjustments to the orientation and/or position of the panels 1A to be milled, or of the tools 6, are such that each time the first transition zone 24 extending along the relevant side 2-3; 4-5 takes a fixed orientation and position in relation to the relevant tools 6.

FIG. 5 clearly shows that the operations S1 carried out for the shaping of the profiled edge areas 9 provide for the achievement of, a final edge 37 of the floor panel 1 which intersects with, or a top edge 38 situated in, the first ascending transition zone 24 of the lower lying area 22. Furthermore, it is clear that the performed operation S1 also provides for the removal of said second ascending transition zone 26 from the lower lying area 22. Thus, part of the first ascending transition zone 24 forms a lower edge area 23 at the top edge 38 of the final floor panel 1.

Figure 6:
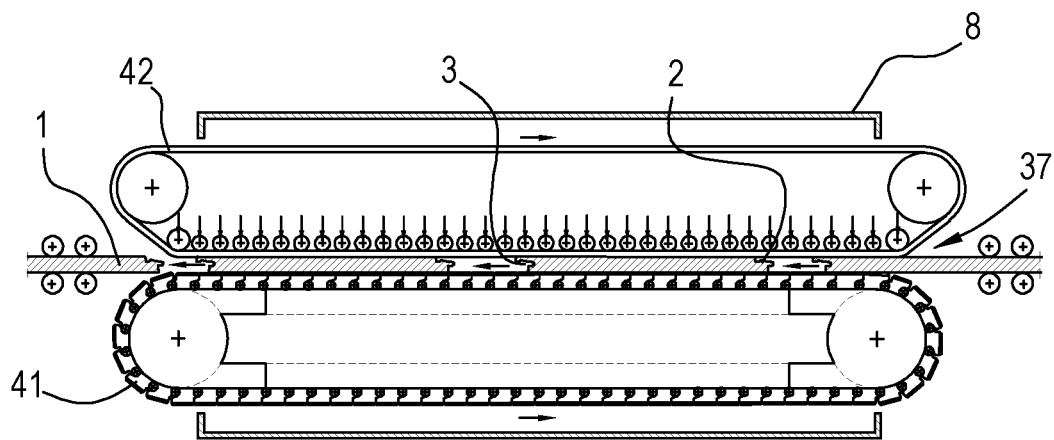
FIG. 6 shows on a larger scale a cross-section of a continuous milling machine as shown in FIG. 1 along line VI-VI.

It is noted that the milling operations S1-S2 in FIG. 1 should preferably be carried out with the top layer 14 facing down, as clearly shown in FIGS. 4, 5 and 6. In the continuous milling machines 7-8 applied here, a conveyor chain 41 and pressure belts 42 are used as a feed-through device 37, wherein the conveyor chain 41 provides the reference height for the positioning of the milling tools 6, and, therefore, the panel 1A is transported clamped between the pressure belts 42 and the conveyor chain 41, with the top layer 14 facing down on the conveyor chain 41.

Figure 7:
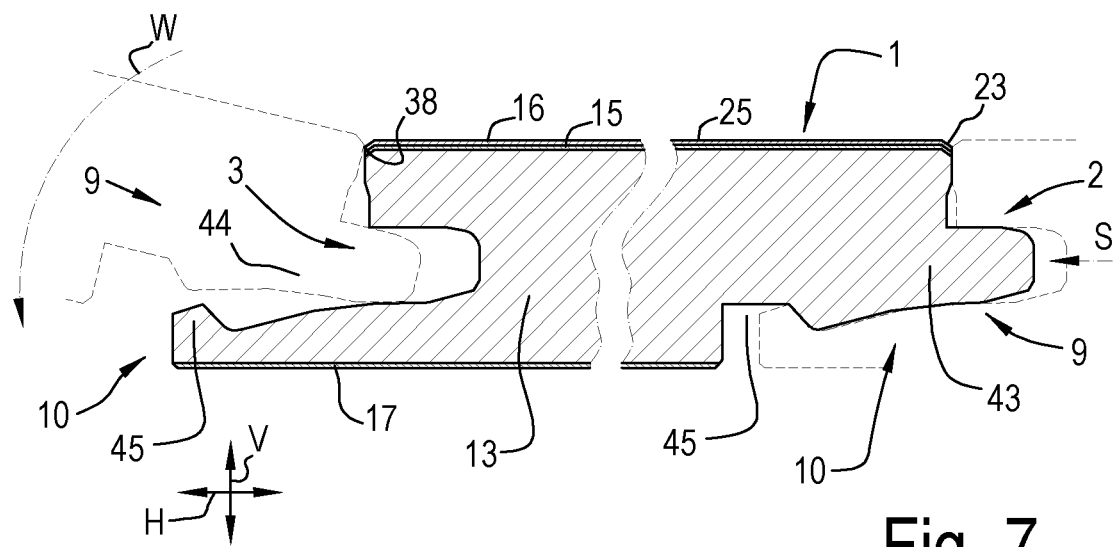
FIG. 7 represents on a larger scale a floor panel realized by the method of the present invention according to the line VII-VII shown in FIG. 1

FIG. 7 shows a floor panel 1 obtained by the method of the invention. FIG. 7 clearly shows that the floor panel 1 has mechanical coupling means 10 at least on the long pair of sides 2-3 to enable two of these floor panels 1 to be coupled together, where, in the coupled condition, there is a lock between the sides 2-3 concerned, both in a horizontal direction H in the plane of the coupled floor panels 1 and perpendicular to the coupled edges 2-3, and in a vertical direction V perpendicular to the plane of the coupled floor panels 1. They are made as a tongue in groove coupling 43-44 equipped with locking means or locking parts 45, wherein said tongue and groove coupling means 43-44 realizes said vertical lock, while said locking devices or parts 45 are provided for the achievement of said locking device in horizontal direction H. Said coupling means 10 are realized in a one-piece manner in the material of the relevant panel 1A, in this case with the essential components 43-44-45 thereof on the substrate 13. As mentioned, the coupling means 10 are provided by means of a milling operation S1 with rotating milling tools 6. The relevant floor panel 1 is also provided with mechanical coupling means 10 on the not shown short pair of opposite sides 4-5. The mechanical coupling means 10 on the long pair of opposite sides 2-3 allow a coupling by means of a tilting movement W along the respective sides 2-3, as well as, preferably, by means of a horizontal sliding movement S of the sides 2-3 towards each other. On the short pair of opposite sides 4-5, coupling means 10 can be used with equal or similar characteristics. According to another example, the coupling means 10 on the short pair of opposite sides 4-5 allow that they, by means of a downward movement of a male coupling part, for example with a tongue, can be brought into a female coupling part, for example with a groove, wherein in coupled condition a lock is created in said vertical and horizontal directions. This is not shown here.

Regarding FIG. 1, it is also noted that the station 35 for potentially adjusting the position and/or orientation of the panel 1A to be machined, does so by adjusting the transverse position of the transverse edges. For this purpose, it may for instance be sufficient to use two actuators 36, one active near each transverse edge. Preferably, the station comprises at least two actuators 36, preferably a first one active near a first transverse edge and a second one active near a second transverse edge. In the example shown, at least two actuators 36 are positioned near the first and second transverse edges, and are active on the opposite long edges. Dashed line 46 shows that the station 35 may be equipped with actuators 36 that are active at a position between the actuators active at the transverse edges. Such actuators can minimize any curvature of the panel 1A or the part concerned, for instance a lower area 22, in the longitudinal direction.

The present invention is by no means limited to the embodiments described above, but similar methods for manufacturing panels may be realized without exceeding the scope of the invention.

The invention claimed is:

1. A method for machining profiled edge areas on a panel, the method comprising:
   providing the panel having a lower area that forms with first and second lower edge areas on opposite first and second sides of the panel, each of the first and second lower edge areas having a first ascending transition zone extending in a first direction to a top surface of the panel, and a second ascending transition zone spaced apart from the first ascending transition zone and extending in a second direction different from the first direction and to a machinable portion of the panel;
   optically determining a position or an orientation of the second ascending transition zone;
   adjusting the position or orientation of the panel into a fixed orientation based on the first ascending transition zone due to the optical determination of the position of the second ascending transition zone; and then
   feeding the panel through a first milling machine in the fixed orientation wherein the fixed orientation is transverse to first milling tools of the milling machine such that the first milling tools remain in position relative to the fixed orientation while the panel is fed through the first milling machine as first and second profiled edge portions are formed along each of the first and second lower edge areas, respectively;
   wherein the second ascending transition zone and machinable portion of each of the first and second lower edges areas is removed by the first milling machine, and at least a portion of the first ascending transition zone remains at a top edge of the profiled edge portion leading to the top surface of the panel.

2. The method according to claim 1, wherein said first and second profiled edge portions define mechanical coupling parts.

3. The method according to claim 1, wherein said panel has a substrate with a decorative top layer attached to the substrate.

4. The method according to claim 1, wherein said panel is a floor panel.

5. The method according to claim 1, wherein after feeding the panel through the first milling machine, the method comprising the step of:
   feeding the panel through a second milling machine having second milling tools arranged for forming third and fourth profiled edges portions along third and fourth edges of the panel, the third and fourth edges are located transversely relative to the first and second profiled edge portions.

6. The method according to claim 5, wherein the second milling tools are adjusted relative to the third and fourth edges without changing the fixed orientation of the panel.

7. The method according to claim 6, wherein said panel is rectangular, the first and second profiled edge portions are formed along a long pair of opposite sides of the panel, and the third and fourth profiled edges are formed along a short pair of opposite sides of the panel.

8. The method according to claim 1, wherein the panel has a MDF (medium density fiberboard) or a HDF (high density fiberboard) substrate, and a decorative top layer attached to the substrate.

9. The method according to claim 8, wherein prior to the step of optically determining a position or orientation of the panel, the top layer extends continuously from the top surface of the panel, and over surfaces of the first and second lower edge areas to at least the machinable portion of the panel.

10. The method according to claim 1, wherein during the step of feeding the panel through a first milling machine, the top surface of the panel faces downward.

* * * * *